United States Patent [19]
Arnold et al.

[11] Patent Number: 5,149,961
[45] Date of Patent: Sep. 22, 1992

[54] METHOD AND APPARATUS FOR OPTICAL FIBER LENGTH DETERMINATION

[75] Inventors: Timonthy G. Arnold, Windsor; Arthur J. Barlow, Alton, both of England

[73] Assignee: EG&G, Ltd., Wokingham, England

[21] Appl. No.: 693,108

[22] Filed: Apr. 24, 1991

[30] Foreign Application Priority Data

Aug. 24, 1990 [GB] United Kingdom ............... 90108699

[51] Int. Cl.$^5$ ............................................. H01J 5/16
[52] U.S. Cl. ................................ 250/227.11; 356/73.1
[58] Field of Search ...................... 250/227.11, 227.12; 356/73.1; 385/3; 359/183, 188, 191, 195

[56] References Cited

U.S. PATENT DOCUMENTS

| | | | |
|---|---|---|---|
| 4,750,833 | 6/1988 | Jones | 356/73.1 |
| 4,794,249 | 12/1988 | Beckmann et al. | 356/73.1 |
| 4,826,314 | 5/1989 | Comte' | 356/73.1 |

*Primary Examiner*—David C. Nelms
*Assistant Examiner*—K. Shami
*Attorney, Agent, or Firm*—Robert P. Cogan

[57] ABSTRACT

In a method and apparatus for measuring length of an optical fiber, a light source of a selected wavelength transmitted along the fiber is modulated by both a first and a second light modulation signal, which light modulation signals each differ in frequency from a first modulation frequency by a fixed amount. A time detector responds, alternately during a period, to the light signal as modulated by of each of the first and second light modulation signals by using each of the light signal modulation frequencies as a reference. Consequently, the output of the time detector has a phase responsive to the effective length of the fiber. A phase sensitive detector receives as a signal input an output of the time detector means. A second modulation frequency defines the period of alternation of response and provides a reference input to the phase sensitive detector. The phase sensitive detector measures the ac component of time detector output in phase with the second modulation frequency to provide an indication of fiber length.

11 Claims, 3 Drawing Sheets

METHOD AND APPARATUS FOR OPTICAL FIBER LENGTH DETERMINATION

BACKGROUND OF THE INVENTION

The present invention relates to a method and means for testing transmissive optical fibers, and more to measuring the length of a fiber.

Optical fiber is increasingly being employed for various forms of signal transmission. The length of a fiber affects the degree to which various parameters come into play in changing a transmitted signal. Such parameters include attenuation per unit length and dispersion of different wavelength components of an optical signal.

The total length of the fiber will be proportional to the delay T produced in the fiber. This delay may be expressed by:

$$T = n(\lambda)L/c, \qquad (1)$$

where T = delay, $n(\lambda)$ is the refractive index of the fiber, L is fiber length, and c is velocity of light in vacuo. The value of $n(\lambda)$ varies with wavelength. This value can be determined for a selected wavelength transmission.

The dispersion phenomenon requires the measurement of difference in arrival times of currently launched components of different wavelengths. A system for measuring fiber optic dispersion is disclosed in United Kingdom Patent 2,183,823 and corresponding U.S. Pat. No. 4,770,833 to Roger S. Jones, the assignee therein having the same parent company as the assignee herein. For a fiber length measurement, a fixed wavelength may be chosen for which the value of $n(\lambda)$ is known or may be derived for a test fiber. The value of $n(\lambda)$ maybe slightly sensitive to temperature or stress on the fiber, but not to a degree significant for purposes of the presented discussion. Typical values of $n(\lambda)$ are in the range of 1.4 to 1.6 for silica based telecommunications grade fiber. With $n(\lambda)$ and c being constant, measurement of fiber delay T maybe used as a measurement for L.

One way to measure T is by measurement of phase shift produced by transmission by the optical fiber of modulated light. By virtue of the delay T, the modulation waveform on the received light is phase shifted by a phase $\phi$ from the original input waveform. This phase may be expressed as $$\phi = T2\pi f, \qquad (2)$$

Where f is a modulation frequency. Also, $$\phi = n(\lambda)2\pi f L/c. \qquad (3)$$

The value of $\phi$ can be determined by the use of a phase sensitive detector.

Static phase shift measurement is subject to undesirable uncertainties. The phase meter (time detector) output is used as a direct current value. Measurement of T is, therefore, subject to customary sources of error such as drift from many sources. Also, the measurement is subject to 1/f noise. Also, this technique is substantially limited to laboratory utilization. The source and the detector must be co-located to achieve synchronization of light source modulation and of phase detector systems.

A differential method eliminates static measurement errors. The present invention utilizes the phenomenon that if F is varied, the phase $\phi$ will vary. It will be seen that $$D\phi = \phi_1 - \phi_2 = 2\pi(\lambda)(F1 - F2)L/c \qquad (4)$$

Where $\phi_1$ and $\phi_2$ are phase shifts obtained for signals modulated at frequencies F1 and F2 respectively.

SUMMARY OF THE INVENTION

It is, therefore, an object of the present invention to provide a method and apparatus for measuring length of an optical fiber wherein sources of error associated with direct current measurement of phase shift are eliminated.

It is more particularly the object of the present invention to provide a method and apparatus of measuring the length of an optical fiber utilizing a double demodulation technique.

It is also an object of the present invention to provide a method and apparatus for measuring length of an optical fiber wherein the detector need not be located at the site of the light source used for measurement, whereby optical fiber length measurements may be made in the field in installed fiber.

Briefly stated, in accordance with the present invention there are provided a method and apparatus for measuring length of an optical fiber wherein a light source of a selected wavelength is transmitted along the fiber and is received by a detector having an output connected to a time detector such as a phase meter. A first and a second light modulation signal are produced in response to the first modulation frequency, the first and second light modulation signals each differ in frequency from the first modulation frequency by a fixed amount. So that the time detector responds, preferably alternately during a period, to modulation of the light signal by of each of the first and a second light modulation signals, the frequencies of the first and second light modulation signals produced in response to the first modulation are each supplied as a reference to the time detector. Consequently, the output of the time detector has a phase responsive to the effective length of the fiber. A phase sensitive detector receives as a signal input an output of the time detector means. A second frequency source comprising low frequency modulation means providing a second modulation frequency defines the period of alternation of the light modulation signals and provides a reference input to the phase sensitive detector. The phase sensitive detector measures the ac component of time detector output in phase with the second modulation frequency to provide an indication of fiber length.

In one embodiment, the first and second modulation signals are generated from a modulator frequency control circuit and provided alternately at the output thereof. The first modulation frequency provides a reference input to the time detector, which may comprise a phase detector.

Alternatively, means may modulate the light signal by imposing both the first and second light modulation signals on the light signal and means may be provided for alternating during the period the reference input to the time detector to render the time detector responsive alternately to the phase of a light signal modulated by the first and second light modulation signal respectively. These means for alternating the reference input to the time detector may be a frequency shift controller coupled to have its period controlled by the second modulation oscillator. Again, the time detector may comprise a phase meter.

The apparatus in another form may further comprise a second light source. In this form, a first directional coupler means for couples the second light source to the optical fiber under test. The second light source is modulated by a signal indicative of intelligence, e.g. the first modulation frequency. Another directional coupler at a remote end of the optical fiber for receives light transmitted therethrough, and a second detector is provided for receiving light from the second directional coupler. A phase locked loop connected to the output of said second detector for deriving intelligence therefrom, whereby the first modulation frequency may be provided to apparatus at a location remote from the first modulation source.

This other form of apparatus could alternatively comprise a second light source at an end of said optical fiber under test remote from said first light source, directional coupler means for coupling light from second light source to said fiber, second directional coupler means at an end of the fiber for receiving light transmitted therefrom, second detector means for receiving light from second light source, and detector means for deriving intelligence from the second light signal. The second light signal transmits intelligence indicative of the first modulation signal from the remote end of the fiber back to the initiating end. In this manner, only a light signal need be transmitted from a first end of the fiber under test, and all measurement and synchronization circuitry may be at the remote end.

The method which may be performed by various forms of apparatus measures the length of an optical fiber by transmitting a light signal from a source at a first end of the optical fiber under test, producing first and second modulation signals of differing frequencies in response to a first modulating frequency, modulating said light by said first and second modulations signals, periodically alternately responding with a time detector to light modulated by each modulation signal to provide a time detector output having a phase responsive to effective length of the fiber under test, and detecting the phase of the time detector output in correspondence with the periodic alternation.

In one form, the step of providing said first and second modulation signals comprises providing a modulation source producing the first modulation frequency, and wherein the step of alternately responding comprises providing said first modulation frequency as a reference to said time detector and alternating modulation of said first and second modulation signals on the light signal a second modulation, wherein the step of detecting the phase comprises detecting outputs of said time detector with a phase sensitive detector and supplying said second modulation frequency as a reference input to said phase sensitive detector.

In another form, the step of alternately responding comprises modulating the light signal by both of said first and second modulation signals and alternating the reference input to said time detector.

BRIEF DESCRIPTION OF THE DRAWINGS

The means by which the foregoing objects and features of invention are achieved are pointed out with particularity in the claims forming the concluding portion of the specification. The invention, both as to its organization and manner of operation, maybe further understood by reference to the following description taken in connection with the following drawings.

Of the drawings.

DESCRIPTION OF THE PREFERRED EMBODIMENTS

Figure 1:
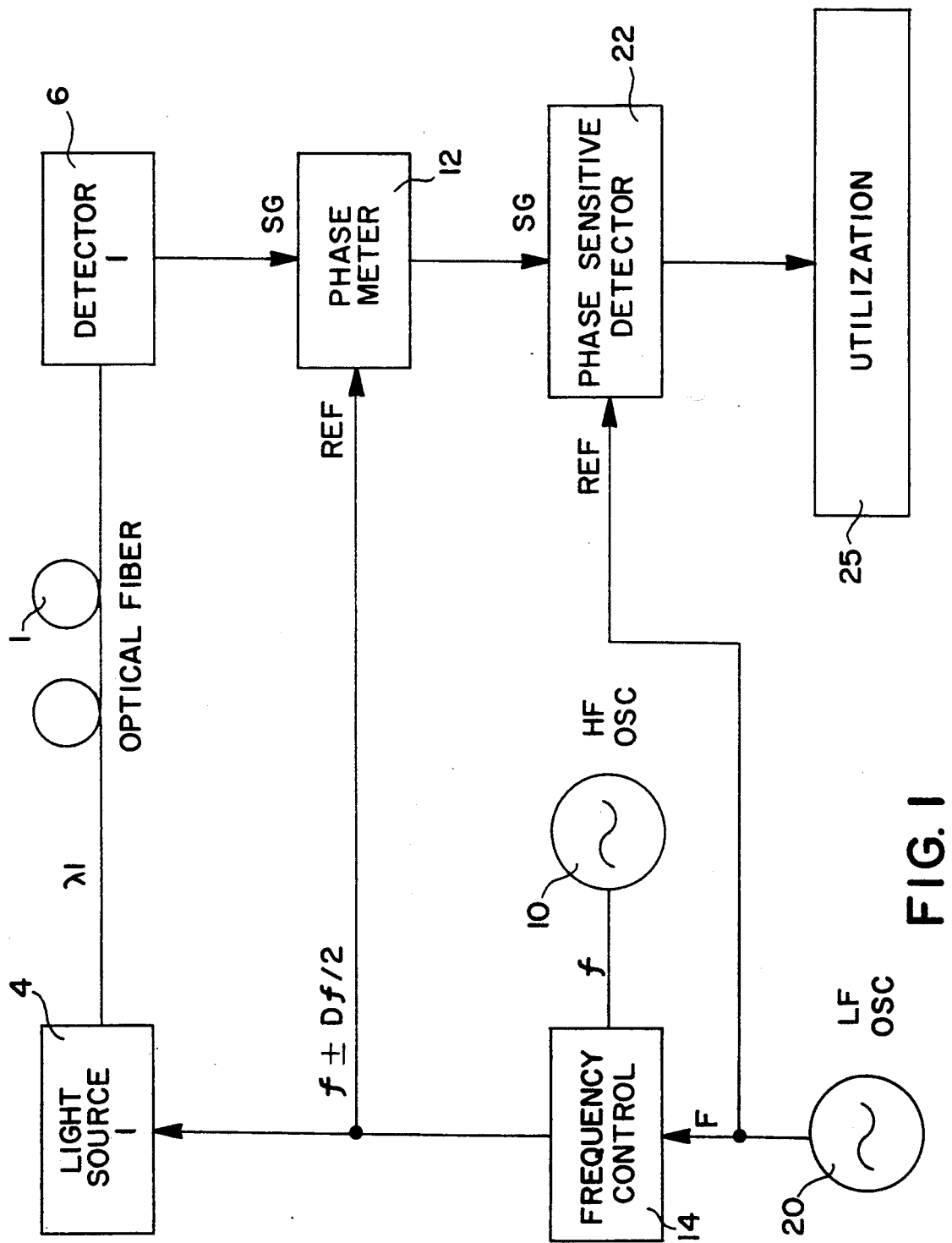
FIG. 1 is a block diagrammatic representation illustrating operation of the present invention in a laboratory setting in which a light source at one end of a fiber under test and detection circuitry at the other end of the fiber under test are directly coupled to each other.

Referring now to FIG. 1 there is illustrated in block diagrammatic form an embodiment of present invention suitable for use in the laboratory. Items requiring synchronization at opposite ends of a fiber optic cable must be located at the same site.

The fiber optic cable under test is a fiber 1. Light to be transmitted through the fiber 1 provided by a light source 4. The light source 4 may conveniently comprise a laser emitting a wavelength for which refractive index of the test fiber 1 is known. A nominal wavelength is 1,500 nm. A light detector 6 receives light transmitted from the source 4 through the fiber 1. The light detector 6 may, for example, comprise a photodiode. A high frequency, first modulation source 10, in the form of an oscillator, is provided in a first modulation loop. The term "high frequency" is used for convenience and denotes high compared to a second reference frequency further described below. The first modulation source 10 provides a reference input to a time detector, preferably a phase meter 12, which receives as its signal input the output of the detector 6.

The first modulation source 10 also provides an input to a frequency control 14 which produces first and second light modulation signals in response to the first modulation frequency. The first and second light modulation signals produced by the frequency control 14 are connected to an amplitude modulation modulator 15 to modulate the light emitted by the source 4. Most conveniently, in one form, the first modulation frequency is a center frequency f. The modulator and frequency control circuit includes a mixer including means for producing a frequency Df so that the frequency control circuit 14 provides first and second modulation signal frequencies of $f+Df/2$ and $f-Df/2$. The first and second light modulation signals are of different frequencies so that the phenomenon described with respect to equation (4) above may be employed and the effect thereof measured in a manner indicative of the length of the fiber 1. The frequencies $f+Df/2$ and $f-Df/2$ correspond to F1 and F2 in equation 4 respectively.

In the present description, the expression responding alternately to modulation of the light signal by the first and second modulation signals is used to indicate that measurements will be made to provide an output indicative of the term $\phi_1-\phi_2$ which is equal to $2\pi(\lambda)(F1-F2)L$, by modulating a light signal having a wavelength $\lambda$ by first and second modulation signal frequencies F1 and F2. Most conveniently in practical embodiments, the alternation of response is periodic. The period is of low frequency, and is determined by a second modulation source 20. The term low is arbitrary. The frequency produced by the source 20 is selected to be useful for the double demodulation technique. The second demodulation loop includes a phase sensitive detector 22 having as its signal input the output of the phase meter 12 and having as its reference input the second modulation source 20. The low frequency oscillator 20 is connected to the control the period of alternation of the output of the modulator/frequency control circuit 14 to provide alternately the first and second light modulation signals. The phase sensitive detector 22 provides an output to utilization means 25 which may comprise display and storage means for indicating length of the optical fiber 1.

In operation, a light signal is provided from the source 4 and launched into the test fiber 1 for reception by the detector 6. Light is modulated by both the first and second light modulation signals. In the embodiment of FIG. 1 the first and second light modulation signals are alternately imposed on the light signal during successive half cycles of the second modulation source 20. The reference input frequency to the phase meter 12 is also switched between f+Df/2 and f−Df/2. The output of the phase meter 12 is indicative of the change and phase of the signal received at the detector 6 with respect to the modulation frequency. The change in phase is expressed as $\phi \pm \mathrm{?} \phi^2$. This output comprises a square wave modulated signal whose amplitude varies depending on the difference in phase shift for the signal modulated at f+Df/2 and that of the signal modulated at f−Df/2. The measurement of D$\phi$ is performed at the phase sensitive detector 22. The phase sensitive detector 22 measures the portion of the square wave output of the phase meter 12 in phase with the low frequency oscillator 20. Consequently, the output of the phase sensitive detector 22 is directly proportional to fiber length. The utilization means 25 may normalize the direct output of the phase sensitive detector 22 to indicate length directly.

While the embodiment of FIG. 1 is highly effective for measurement of fiber length, synchronization between phase meter 12 and the oscillator 10 and modulator 14 is required. The oscillator 10 and modulator circuit 14 must provide a modulation frequency at a first end of the optic fiber, and the phase meter 12 must be at a second end of the optic fiber. For measurements in the field it is desirable to have measurement equipment at one end of the fiber optic cable 1 not physically connected to measurement equipment at the other end of the fiber optic cable 1 except by the fiber optical cable 1 itself.

Figure 2:
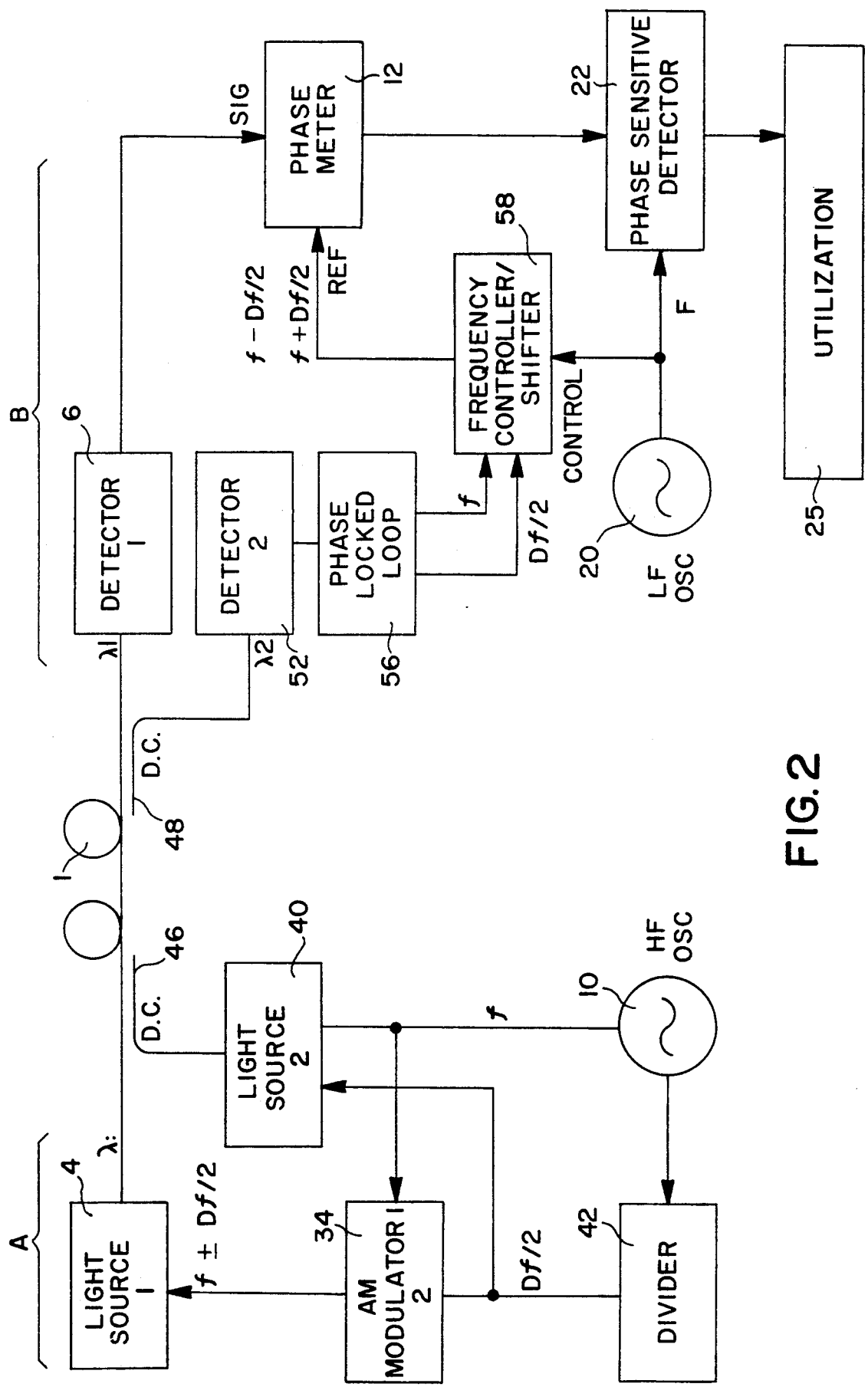
FIGS. 2 and 3 are block diagrammatic representations of systems in which the light source and the detection circuitry may be at locations remote with respect to each other, whereby fiber length measurement outside of the laboratory is facilitated.
Figure 3:
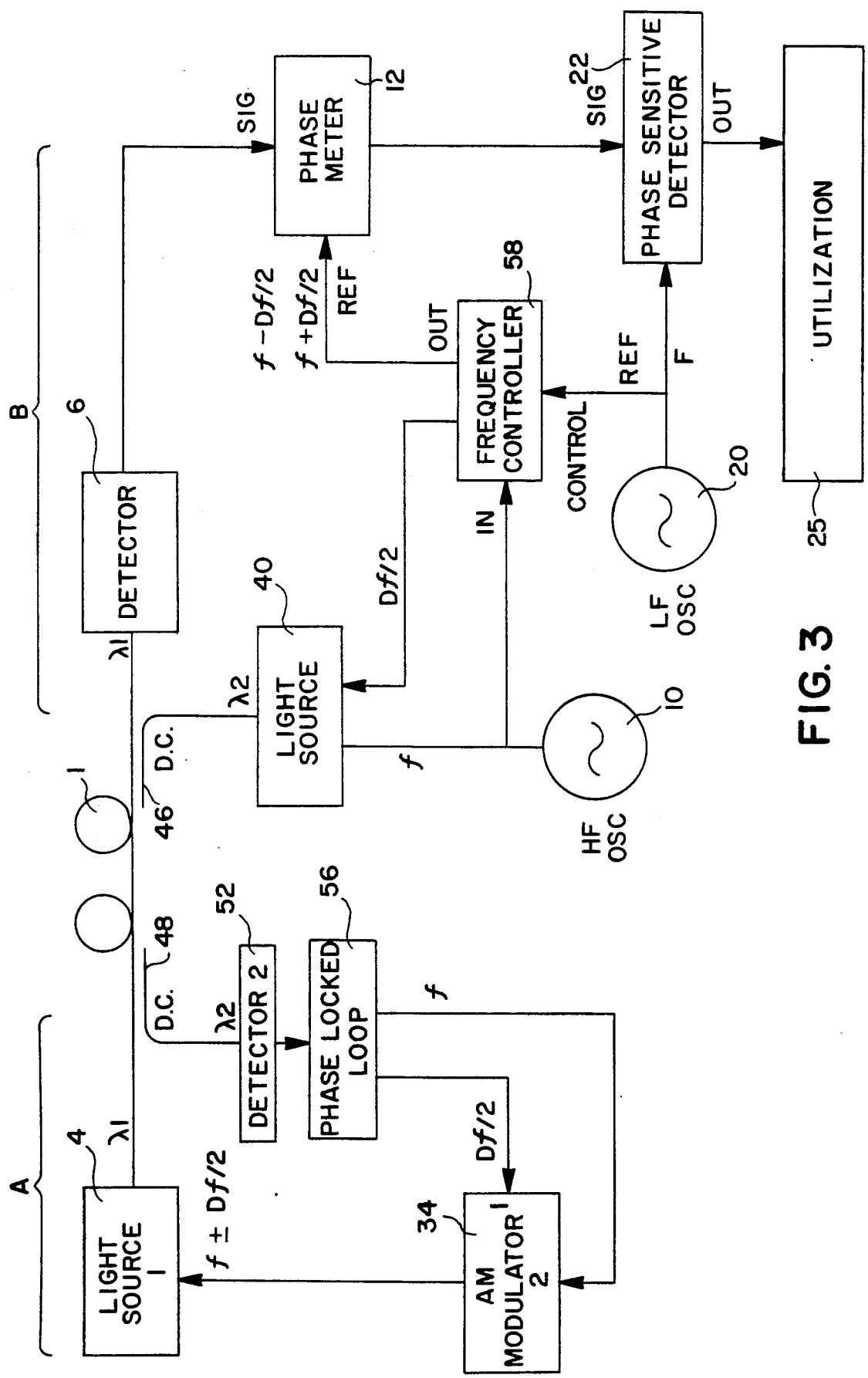

The embodiments of FIGS. 2 and 3 are useful for measurements in the field. In FIGS. 1, 2 and 3, the same reference numerals are used to denote corresponding components. In FIG. 2, a light source 4 once again provides light at a wave length λ. The light from the source 4 is again launched into an optic cable 1 for reception by a detector 6. In the embodiment of FIG. 2, frequency switching of the modulation frequency is replaced by simultaneously sending both frequencies, i.e. f±Df/2. This is accomplished by providing a conventional amplitude modulator 34 similar to the modulator 15 of FIG. 1. The Modulator 34 imposes first and second light modulation frequencies on the light. Again, the first and second light modulation frequencies are produced in response to the first modulation frequency produced by the first modulation source 10. A frequency control circuit 42 supplies to the modulator 34 two side bands of the frequency f in a manner similar to the frequency control circuit 14. The carrier f may be suppressed by conventional means. In this embodiment, the two light signals modulated by one of the first and second light modulation signals are both transmitted at the same time. Therefore, each is transmitted at half the power of the embodiment of FIG. 1. However, that is not a significant reduction in power affecting the ability to measure detected phases.

The detector 6 again provides an output to a phase meter 12. In order to provide the equivalent operation to the embodiment in FIG. 1 without the need to physically connect the phase meter 12 to the high frequency oscillator 10, the following technique and apparatus are utilized. The detector 6 detects only the light at wavelength λ, by use of suitable optical filtering. A second detector 52 is provided to detect light at wavelength $\lambda^2$, again by use of suitable optical filtering. A second light source 40 is provided which modulated at the first modulation frequency. A first optical directional coupler 46 and a second optical directional coupler 48 at at opposite ends of the optical fiber 1 couple the second light signal to a second detector 52. The detector 52 includes appropriate filter means whereby the detector 52 responds to light at the wavelength λ2. The detector 52 provides an output to a phase locked loop 56. The phase locked loop is constructed to to derive intelligence from the output of the second detector 2 indicative of the first modulation frequency. The output of the phase locked loop 56 is connected to supply the first modulation frequency. In this manner, the phase meter 12 and high frequency oscillator 10 may be at opposite ends of the fiber 1 under test.

Alternate periods of each reference frequency input to the time detector, the phase meter 12, are established as in the embodiment of FIG. 1. The low frequency oscillator 20 has an input connected to control the alternation of the output of the frequency controller 14. During a first alternate cycle of operation, the light modulated at frequency f−Df/2 is compared to a reference signal, and during a second selected period, the light modulated at frequency f+Df/2 is compared to a reference signal. Consequently, a square wave output is provided in FIG. 2 as in FIG. 1. Again, a phase sensitive detector 22 is provided having the square wave output of the phase meter 12 as its signal input and the low frequency oscillator 20 providing the second modulation frequency as a reference input. The phase sensitive detector 22 provides a dc output to utilization means 25.

The embodiment of FIG. 3 is particularly useful in measuring length of optical fibers already installed in the field. This embodiment uses two way transmission on the optical fiber 1 so that the high and low frequency oscillators 10 and 20 may be at the same end of the fiber 1 as the phase meter 12 and phase sensitive detector 22. In the embodiment of FIG. 3, the second light source 40 is at the same end of the optical fiber 1 as the measurement circuitry. The positions of the optical directional couplers 46 and 48 are reversed with respect to FIG. 2 to indicate that transmission of the second light signal is in the opposite direction. The directional coupler 48 receives light at wavelength λ2 at a detector 52 providing an output to the phase locked loop 56. The modulator 34 and frequency control circuit 42 are connected as in the embodiment of FIG. 2. The phase locked loop 56 provides an input to the frequency control circuit 42. The frequency controller 14 is coupled directly to the first modulation source 10, which also modulates the light source 40. The frequency controller 14, phase meter 12, detector 1, phase sensitive detector 22, low frequency oscillator 20 and utilization means 25 are connected as in the embodiment of FIG. 2. The high frequency oscillator 10 is located at the end of the fiber 1 receiving the first light signal.

In the present description, length measurement refers to effective length measurement. For a given set of strain and temperature parameters, actual length is measured. The present measurement system is capable of measuring the $\Delta \phi/Df$. Consequently, a length measurement is given period when the value $D\phi/Df$ is subject to strain or thermally induced delay changes, the length measurement is herein provides a measurement indicative of such changes. Thus, in the present description, effective length measurements, or simply length measurement, includes measurement of phase differential with respective frequency indicative of parameter of affecting phase change for a given length.

In addition in both FIGS. 2 and 3, the am modulator 34 could be replaced by a single side band modulator so that frequencies $f+Df/2$ and $f-df/2$ are generated sequentially. Additional frequency synchronization at lower frequency F is required with light source 40, detector 52 and the locked loop 56 (modified version) in each case. The am modulator then acts as frequency controller 14 as in FIG. 1. Because of the need to separate the two units at each end of the fiber 1 under test, the frequency controller 14 must be added at the receiving end of the fiber. In fact, in both FIGS. 2 and 3 synchronization at f and f is achieved. In the case of FIG. 2 modulation sources 10 and 20 located at opposite ends of the fiber under test, and in the case of FIG. 3 the modulation sources 10 and 20 are located together at the receiving end of the fiber.

The embodiments of FIGS. 2 and 3 provide a field system providing high precision and repeatability and in which it is not necessary to physically connect synchronization apparatus at remote ends of optical fiber 1. Synchronization of both transmission and receiving units at frequencies and F is achieved. It is important to know that any source unit 4 or 40 is usable with any detector 6 or 32. A work crew in the field need not be relied upon to match up members of individually paired units. Consequently a highly versatile, accurate, reliable system for measuring optical fiber length in the field is provided.

It should also be noted that the present system can measure further parameters. After the present system has been used to measure a fiber length, the length, then becomes a known value. The present system can measure delay changes induced by such factors as strain or thermally induced changes for a fiber of a known length measured at a baseline temperature and stress.

What is claimed as new and desired to be secured by Letters Patent of the United States is:

1. Apparatus for measuring optical fiber length comprising: a light source for launching a light signal into an optical fiber under test, detector means at a remote end of said fiber for responding to said light source, time detector means for responding to the output of said detector, first modulation means defining a first modulation frequency, means responsive to said first modulation means for producing first and second light modulation signals each differing in frequency from the first modulation frequency by a fixed amount, light modulation means for modulating said light signal by said first and second light modulation signals, means for responding alternately to the phase of the output of said detector means indicative of the light signal modulated by of each of the first and second light modulation signals, whereby the output of said time detector has a phase responsive to the effective length of the fiber, a phase sensitive detector receiving as a signal input an output of said time detector means, a second modulation source comprising a low frequency modulation means providing a second modulation frequency for determining the alternation of response by said time detector and for providing a reference input to said phase sensitive detector for enabling said phase sensitive detector to provide an output indicative of a proportion of the time detector output in phase with said second modulation frequency.

2. The apparatus according to claim 1 wherein said means for responding alternately comprises means providing the respective frequencies of said first and second light modulation signals alternately from said frequency control circuit during the period as a reference input to said time detector.

3. The apparatus according to claim 2 wherein said means responsive to said first modulation means comprises means supplying said first modulation frequency and frequency control circuit means producing frequencies of said first and second light modulation signals for generation of said first and second light modulation signals and for generation of said reference input to said time detector.

4. The apparatus according to claim 3 wherein said time detector comprises a phase detector.

5. The apparatus according to claim 4 wherein said frequency control means comprises a first and a second frequency control each located at an opposite end of said fiber under test and each respectively connected to said light modulation means and as said reference input to said time detector, said first modulation means comprises a modulation source at one end of said fiber coupled to one said said frequency control circuit and wherein said means supplying said first modulation frequency further comprises a second light source providing a second light signal, means for modulating said first modulation frequency on said second light source, first and second optical directional couplers at opposite ends of the fiber under test, second detector means for receiving the second light signal, and means for deriving modulated intelligence from said second light signal for supplying an output comprising said first modulation frequency coupled to the second frequency control circuit.

6. The apparatus according to claim 5 wherein said first modulation source and said second light source are located at a same end of the fiber under test as said second modulation source, said time detector and said phase sensitive detector.

7. The apparatus according to claim 6 wherein said light modulation means comprises means for modulating said light signal by both said first and second light modulation signals simultaneously.

8. The apparatus according to claim 5 wherein said first modulation source and said first light source are located at a same end of the fiber under test and at an opposite end from said time detector and said phase sensitive detector.

9. A method for measuring the length of an optical fiber comprising: transmitting a light signal from a source at a first end of the optical fiber under test, producing first and second modulation signals of differing frequencies in response to a first modulating frequency, modulating said light by said first and second modulations signals, periodically alternately responding with a time detector to light modulated by each modulation signal to provide a time detector output having a phase responsive to effective length of the fiber under test, and detecting the phase of the time detector output in correspondence with the periodic alternation.

10. The method according to claim 9 wherein the step of providing said first and second modulation signals comprises providing a modulation source producing the first modulation frequency, and wherein the step of alternately responding comprises providing said first modulation frequency as a reference to said time detector and alternating modulation of said first and second modulation signals on the light signal a second modulation, wherein the step of detecting the phase comprises detecting outputs of said time detector with a phase sensitive detector and supplying said second modulation frequency as a reference input to said phase sensitive detector.

11. The method according to claim 9 wherein the step of alternately responding comprises modulating the light signal by both of said first and second modulation signals and alternating the reference input to said time detector, whereby said modulator may be at an end of the test fiber remote from the time detector and detection can be achieved with no other physical connection of the second modulation so to apparatus at the first end of the optical fiber under test.

* * * * *